US005808674A

United States Patent [19]

Adams, Jr. et al.

[11] Patent Number: 5,808,674

[45] Date of Patent: Sep. 15, 1998

[54] PRODUCING AND IMPROVED DIGITAL IMAGE FROM DIGITAL SIGNALS CORRESPONDING TO PAIRS OF PHOTOSITES

[75] Inventors: James E. Adams, Jr.; John F. Hamilton, Jr., both of Rochester, N.Y.; Eiichi Shimizu, Yokohama, Japan

[73] Assignee: Eastman Kodak Company, Rochester, N.Y.

[21] Appl. No.: 709,900

[22] Filed: Sep. 9, 1996

[51] Int. Cl.[6] ..................... H04N 3/14; H04N 5/335; H04N 9/04; H04N 9/083

[52] U.S. Cl. ..................... 348/273; 348/279

[58] Field of Search ..................... 348/272, 273, 348/276, 277, 279, 280

[56] References Cited

U.S. PATENT DOCUMENTS 5,477,345 12/1995 Tse .......................... 348/272
5,506,619 4/1996 Adams, Jr. et al. .......................... 348/272
5,631,703 5/1997 Hamilton, Jr. et al. .......................... 348/273

*Primary Examiner*—Andrew I. Faile
*Assistant Examiner*—Alicia M. Harrington
*Attorney, Agent, or Firm*—Raymond L. Owens

[57] ABSTRACT

Apparatus is disclosed for processing a digitized image obtained from an image sensor having color photosites aligned in rows and columns that generate at least four separate color values but only one color value for each photosite location, adjacent rows of values for each photosite being combined so that for each pair of photosites there is a single color value which is a combination of at least two different color values. In this apparatus, the combined single color values are used to produce Laplacian values for each pair of photosites. Also, the color signal values corresponding to adjacent pairs of photosites and the Laplacian values are used to produce a luminance value corresponding to each pair of photosites. Thereafter, color signal values corresponding to adjacent pairs of photosites and the Laplacian values are used to produce a chrominance value corresponding to each pair of photosites, and the luminance and chrominance values corresponding to each pair of photosites are used to produce a full color digitized image.

4 Claims, 4 Drawing Sheets

| | |
|---|---|
| G1 | M5 |
| Y2 | C6 |
| M3 | G7 |
| Y4 | C8 |

FIG. 4a

| | |
|---|---|
| G1+Y2 | M5+C6 |
| M3+Y4 | G7+C8 |

FIG. 4b

| | |
|---|---|
| GY1 | MC3 |
| MY2 | GC4 |

FIG. 4c

| | | |
|---|---|---|
| MY1 | GC2 | MY3 |
| GY4 | MC5 | GY6 |
| MY7 | GC8 | MY9 |

FIG. 5

| | | | | |
|---|---|---|---|---|
| MC1 | GY2 | MC3 | GY4 | MC5 |
| GC6 | MY7 | GC8 | MY9 | GC10 |
| MC11 | GY12 | MC13 | GY14 | MC15 |
| GC16 | MY17 | GC18 | MY19 | GC20 |
| MC21 | GY22 | MC23 | GY24 | MC25 |

FIG. 6

PRODUCING AND IMPROVED DIGITAL IMAGE FROM DIGITAL SIGNALS CORRESPONDING TO PAIRS OF PHOTOSITES

FIELD OF THE INVENTION

The present invention relates to producing an improved digital image from an electronic still camera.

BACKGROUND OF THE INVENTION

In electronic photography, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of photosites that are covered by a pattern of cyan, magenta, yellow, and green filters. This type of sensor is known as a color filter array or CFA. Below is shown the cyan (C), magenta (M), yellow (Y), and green (G) pixels arranged in rows and columns on a conventional color filter array sensor. For a more detailed description see U.S. Pat. No. 4,670,777 to Ishikawa et al.

| |
|---|
| G M G M |
| Y C Y C |
| M G M G |
| Y C Y C |

When a color image is captured using this type of color filter array, it is often desirable to combine adjacent pairs. FIG. 4*a* is a two columns by four rows of a repeating portion of a conventional CFA. FIG. 4*b* shows a matraix of data produced from FIG. 4*a* with adjacent vertical pairs of pixels combined to create a new data matrix that is two columns by two rows. FIG. 4*c* shows another data matrix which is produced from FIG. 4*a* and is used to reconstruct a full-color digital image.

For example, beginning with a three by three data matrix produced from FIG. 4*a* and as shown in FIG. 5, a standard method for reconstructing a full-color digital image will now be briefly discussed. The first step is to calculate a luminance value at each pixel. We define luminance, V, as V=(MC+GY)/2=(MY+GC)/2. Therefore, to calculate the value V5, the luminance value at pixel 5 in FIG. 5, the value of the missing pixel color value, GY5, is estimated and then the definition of V is applied:

$$GY5=(GY4+GY6)/2$$

$$V5=(MC5+GY5)/2$$

The next step is to calculate a row chrominance value for pixel 5. Since pixel 5 lies in a GY/MC row, the row chrominance value is CB, which is defined as CB=MC−GY. If pixel 5 had been in a MY/GC row, then the row chrominance value would be CR, defined as CR=MY−GC. To calculate the row chrominance value for pixel 5, CB5, the missing pixel color value, GY5, is estimated and then the definition of CB is applied:

$$GY5=(GY4+GY6)/2$$

$$CB5=MC5-GY5$$

The process of calculating luminance and row chrominance values for each pixel in the sensor is completed before proceeding to the next step. Once luminance and row chrominance values have been calculated for each pixel, a column chrominance value is calculated for each pixel in the sensor. Referring again to FIG. 5., since pixel 5 is in a GY/MC row, the column chrominance value is CR. If pixel 5 had been in a MY/GC row, then the column chrominance value would be CB. The column chrominance value for pixel 5, CR5, is estimated by averaging the values of CR that are immediately above and below pixel 5:

$$CR5=(CR2+CR8)/2$$

Once the column chrominance values for each pixel in the sensor have been computed, the corresponding red, green and blue pixel values for each pixel in the sensor are calculated. For pixel 5, this is accomplished by:

$$R5=V5+CR5$$

$$G5=V5$$

$$B5=V5+CB5$$

At this point a full-color digital image has been reconstructed. The image quality of the reconstructed image is compromised by the choice of calculations used to estimate missing pixel color values. The reconstructed image has zipper artifacts along vertical edges, highly colored salt and pepper pixel artifacts throughout the image and an overall blurring of all edges in the image.

SUMMARY OF INVENTION

It is an object of this invention to provide an improved apparatus which uses single color values corresponding to pairs of photosites for producing an improved digital image with reduced artifacts.

This object is achieved in apparatus for processing a digitized image obtained from an image sensor having color photosites aligned in rows and columns that generate at least four separate color values but only one color value for each photosite location, adjacent rows of values for each photosite being combined so that for each pair of photosites there is a single color value which is a combination of at least two different color values, the improvement comprising:

- means responsive to the combined single color values to produce Laplacian values for each pair of photosites;
- means responsive to color signal values corresponding to adjacent pairs of photosites and the Laplacian values to produce a luminance value corresponding to each pair of photosites;
- means responsive to color signal values corresponding to adjacent pairs of photosites and the Laplacian values to produce a chrominance value corresponding to each pair of photosites; and
- means responsive to the luminance and chrominance values corresponding to each pair of photosites to produce a full color digitized image.

One advantage of this invention is that the color saturation of the pixel artifacts, both zipper and salt and pepper, is reduced. A second advantage is that edges in the reconstructed image are sharper.

BRIEF DESCRIPTION OF THE DRAWINGS

FIG. 4*a* depicts a repeating pattern showing two columns of pixels by four rows of pixels of a prior CFA;

FIG. 4*b*, using the pattern of FIG. 4*a*, shows how adjacent vertical pairs of pixels are combined to create a new data matrix that is two columns by two rows;

FIG. 4*c* shows one resulting data matrix which can be used to reconstruct a full-color digital image;

FIG. 5 shows another data matrix which can be used for reconstructing a full-color digital image from the data matrix shown in FIG. 4*c*; and FIG. 6 shows an expanded data matrix produced from FIG. 4*c*.

DETAILED DESCRIPTION OF THE INVENTION

Since single-sensor electronic cameras employing color filter arrays are well known, the present description will be directed in particular to elements forming part of, or cooperating more directly with, apparatus and method in accordance with the present invention. Elements not specifically shown or described herein may be selected from those known in the art.

Figure 1:
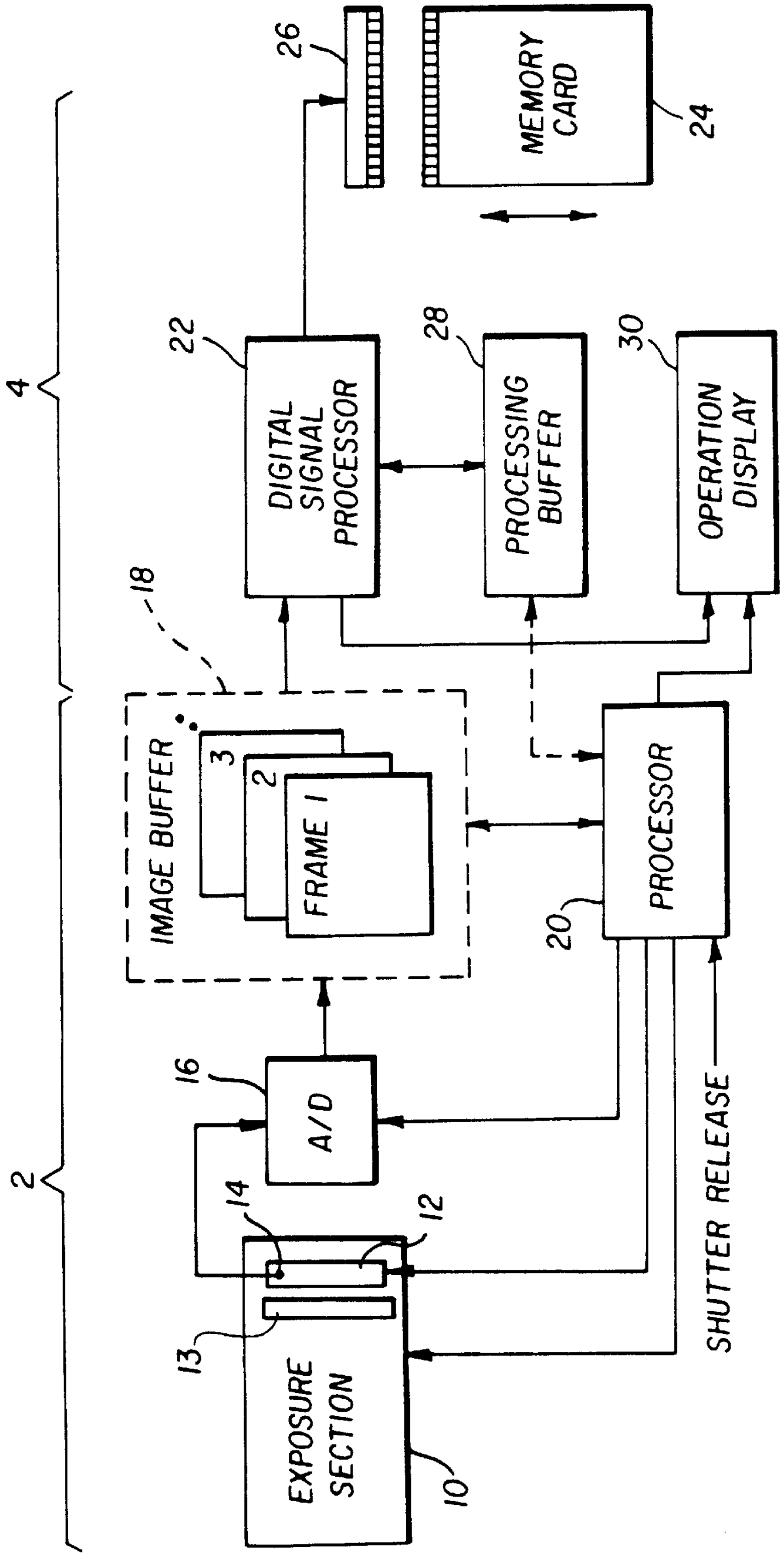
FIG. 1 is a block diagram of processing circuitry for practicing the present invention to produce improved digital image.
Figure 2:
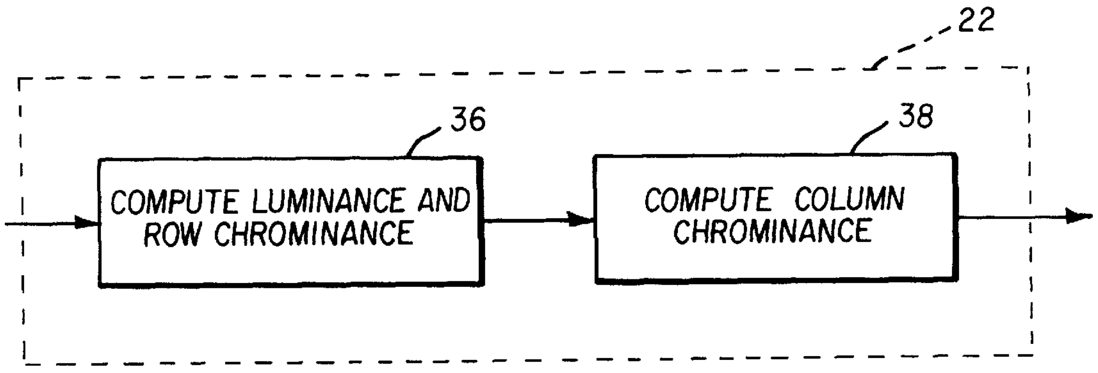
FIG. 2 is a more detailed block diagram of the digital single processor 22 shown in FIG. 1.

Referring initially to FIGS. 1 and 2, an electronic still camera is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of photosites corresponding to picture elements of the image, is a conventional charge-coupled device (CCD) using either well-known interline transfer or frame transfer techniques. The image sensor 12 is covered by a color filter array (CFA) 13, which is described in U.S. Pat. No. 4,670,777. In this geometry each color covers a photosite, or picture element (pixel), of the sensor. The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by operation by the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The digital signal processor 22 applies an interpolation algorithm to the digital image signals, and sends the interpolated signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a neighborhood interpolation to begin, a block of signals including at least a portion of the image signals comprising a video frame must be available. Consequently, in most circumstances, the interpolation may commence as soon as the requisite block of picture elements is present in the buffer 18.

The input section 2 operates at a rate commensurate with normal operation of the camera while interpolation, which may consume more time, can be relatively divorced from the input rate. The exposure section 10 exposes the image sensor 12 to image light for a time period dependent upon exposure requirements, for example, a time period between 1/1000 second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the camera. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2. First, the luminance and the row chrominance are computed as shown in block 36. After that computation is completed, the column chrominance are computed in block 38. These computation processes will be described in more detail in accordance with FIGS. 3*a* and 3*b*.

Figure 3B:
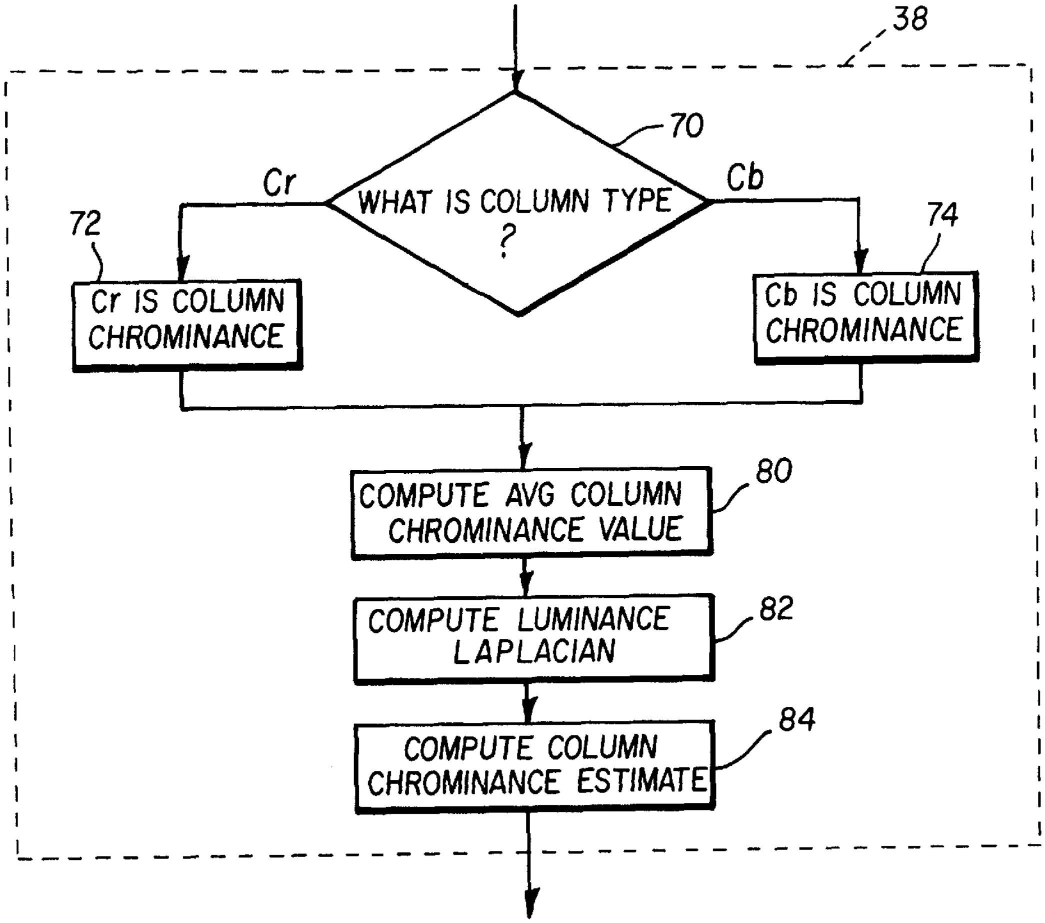
FIG. 3*b* depicts a flow chart which can compute column chrominance signals as shown in block 38 of FIG. 2.
Figure 3A:
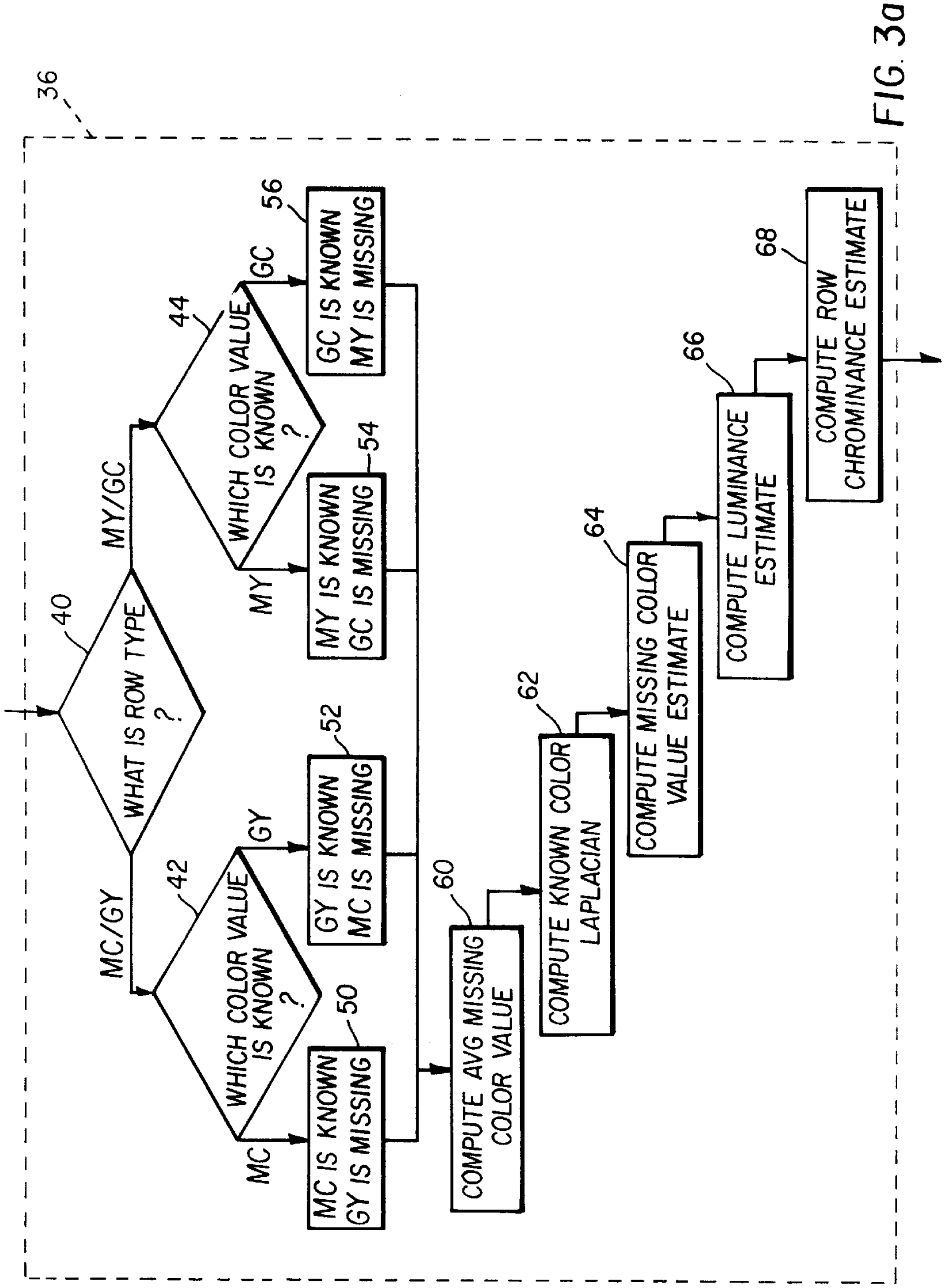
FIG. 3*a* depicts a flow chart of a computer program which can compute luminance and row chrominance signals as shown in block 36 of FIG. 2.

Turning now to FIG. 3*a*, which shows a flow chart for calculating luminance and row chrominance, it will be understood that this process can be either hard wired or provided on a computer product such as a compact disc which can be transferred into a computer which performs the functions of FIG. 2. It will be understood that the steps set forth below can be employed on a computer readable storage medium. The computer readable storage medium may comprise, for example, magnetic storage media such as magnetic disc (such as a floppy disc) or magnetic tape; optical storage media such as optical disc, optical tape, or machine readable bar code; solid state electronic storage devices such as random access memory (ROM), or read only memory (RAM); or any other physical device or medium employed to store a computer program.

In FIG. 3*a*, the top three structures (blocks 40, 42, and 44) are branch points which determine which of four cases is true for the given row and pixel. A concise summary for each of these four cases is stated in blocks 50, 52, 54, and 56. Once the correct case has been identified, a sequence of five calculations is made (blocks 60, 62, 64, 66, and 68) to produce a luminance value and a row chrominance value.

In FIG. 3*b*, there is a single branch point (block 70) to determine which of two cases is true for the given column and pixel. A concise summary for each case is stated in blocks 72 and 74. Once the correct case has been identified, a sequence of three calculations is made (blocks 80, 82, and 84) to produce a column chrominance value.

Referring to the data matrix in FIG. 6, the calculation of luminance, V, is improved by calculating an improved estimate for the required missing pixel value. To review the prior art, to calculate the value V13, the luminance value at pixel 13 in FIG. 6, the value of the missing pixel color value, GY13, is estimated and then the definition of V is applied.

$$GY13=(GY12+GY14)/2$$

$$V13=(MC13+GY13)/2$$

A Laplacian value calculated from pixel values in the same row as pixel 13 as a correction term is now added to the calculation of GY13 producing GY13*. Referring now to FIGS. 3*a* and 3*b* where various computation blocks are shown; the detailed functions that these blocks compute will now be set forth and identified by their corresponding computation block number.

compute average missing color value (block 60) $(GY12+GY14)/2$ compute known color Laplacian (block 62) $(-MC11+2MC13-MC15)/6$ $GY13^*$(block 64)$=(GY12+GY14)/2$(block 60)$+(-MC11+2MC13-MC15)/6$(block 62)

The calculation of V13 is now the same as before except that the improved value for GY13, GY13*, is used:

$V13=(MC13+GY13^*)/2$(block 66)

The next step of calculating a row chrominance value for pixel 13 is also improved. Since pixel 13 lies in a GY/MC row, the row chrominance value is CB. To calculate an improved row chrominance value for pixel 13, CB13, a Laplacian value calculated from pixel values in the same row as pixel 13 as a correction term is again added to the calculation of GY13, producing GY13*. The value GY13* is then used in the calculation of CB13:

$GY13^*$(block 64)$=(GY12+GY14)/2$(block 60)$+(-MC11+2MC13-MC15)/6$(block 62)

$CB13=MC13-GY13^*$(block 68)

As before, the process of calculating luminance and row chrominance values for each pixel in the sensor is completed before proceeding to the next step. Once luminance and row chrominance values have been calculated for each pixel, an improved column chrominance value is calculated for each pixel in the sensor. Referring again to FIG. 6., since pixel 13 is in a GY/MC row, the column chrominance value is CR. The column chrominance value for pixel 13, CR13, is improved by adding a Laplacian value calculated from the luminance values in the same column as pixel 13, producing CR13*:

$CR13=(CR8+CR18)/2$(block 80)

compute luminance Laplacian $(-V8+2V13-V18)$(block 82)

$CR13^*$(block 84)$=CR13+(-V8+2V13-V18)$(block 82)$*(CR13/(2V13))$

Once the column chrominance values for each pixel in the sensor have been computed, the corresponding red, green and blue pixel values for each pixel in the sensor are calculated as before.

At this point a full-color digital image has been reconstructed. The image quality of the reconstructed image is enhanced over the prior art by improving the choice of calculations used to estimate missing pixel color values. As a result, the pixel artifacts in the reconstructed image (zipper artifacts along vertical edges and salt and pepper pixel artifacts throughout the image) have reduced color saturation. Also the overall blurring of all edges in the image has been reduced.

The invention has been described in detail with particular reference to certain preferred embodiments thereof, but it will be understood that variations and modifications can be effected within the spirit and scope of the invention.

Parts List

| | |
|---|---|
| 2 | input section |
| 4 | recording section |
| 10 | exposure section |
| 12 | image sensor |
| 13 | color filter array |
| 14 | output diode |
| 16 | A/D converter |
| 18 | image buffer |
| 20 | control processor |
| 22 | digital signal processor |
| 24 | memory card |
| 26 | connector |
| 28 | processing buffer |
| 30 | display panel |
| 36 | luminance section |
| 38 | chrominance section |

We claim:

1. In apparatus for processing a digitized image obtained from an image sensor having color photosites aligned in rows and columns that generate at least four separate color values but only one color value for each photosite location, adjacent rows of values for each photosite being combined so that for each pair of photosites there is a single color value which is a combination of at least two different color values, the improvement comprising:

means responsive to the combined single color values to produce Laplacian values for each pair of photosites;

means responsive to color signal values corresponding to adjacent pairs of photosites and the Laplacian values to produce a luminance value corresponding to each pair of photosites;

means responsive to color signal values corresponding to adjacent pairs of photosites and the Laplacian values to produce a chrominance value corresponding to each pair of photosites; and means responsive to the luminance and chrominance values corresponding to each pair of photosites to produce a full color digitized image.

2. In apparatus for processing a digitized image obtained from an image sensor having color photosites aligned in rows and columns that generate at least four separate color values but only one color value for each photosite location, adjacent rows of values for each photosite being combined so that for each pair of photosites there is a single color value which is a combination of at least two different color values, the improvement comprising:

means responsive to the combined single color values to produce Laplacian values for each pair of photosites;

means responsive to color signal values corresponding to adjacent pairs of photosites and the Laplacian values to produce a luminance value corresponding to each pair of photosites;

means responsive to color signal values corresponding to adjacent pairs of photosites and the Laplacian values to produce row and column chrominance values corresponding to each pair of photosites; and means responsive to the luminance and row and column chrominance values corresponding to each pair of photosites to produce a full color digitized image.

3. A computer readable memory having a program for processing a digitized image obtained from an image sensor having color photosites aligned in rows and columns that generate at least four separate color values but only one color value for each photosite location, adjacent rows of values for each photosite being combined so that for each pair of photosites there is a single color value which is a combination of at least two different color values, said memory comprising:

means responsive to the combined single color values to produce Laplacian values for each pair of photosites;

means responsive to color signal values corresponding to adjacent pairs of photosites and the Laplacian values to produce a luminance value corresponding to each pair of photosites;

means responsive to color signal values corresponding to adjacent pairs of photosites and the Laplacian values to produce a chrominance value corresponding to each pair of photosites; and means responsive to the luminance and chrominance values corresponding to each pair of photosites to produce a full color digitized image.

4. A computer readable memory having a program for processing a digitized image obtained from an image sensor having color photosites aligned in rows and columns that generate at least four separate color values but only one color value for each photosite location, adjacent rows of values for each photosite being combined so that for each pair of photosites there is a single color value which is a combination of at least two different color values, said memory comprising:

means responsive to the combined single color values to produce Laplacian values for each pair of photosites;

means responsive to color signal values corresponding to adjacent pairs of photosites and the Laplacian values to produce a luminance value corresponding to each pair of photosites;

means responsive to color signal values corresponding to adjacent pairs of photosites and the Laplacian values to produce row and column chrominanance values corresponding to each pair of photosites; and means responsive to the luminance and row and column chrominance values corresponding to each pair of photosites to produce a full color digitized image.

* * * * *

UNITED STATES PATENT AND TRADEMARK OFFICE

CERTIFICATE OF CORRECTION

PATENT NO. : 5,808,674
APPLICATION NO. : 08/709900
DATED : September 15, 1998
INVENTOR(S) : Adams, Jr. et al.

It is certified that error appears in the above-identified patent and that said Letters Patent is hereby corrected as shown below:

On the title page item [54], delete "AND" and insert --AN--

Signed and Sealed this
Twenty-fourth Day of February, 2015

Michelle K. Lee
*Deputy Director of the United States Patent and Trademark Office*

UNITED STATES PATENT AND TRADEMARK OFFICE

CERTIFICATE OF CORRECTION

PATENT NO. : 5,808,674
APPLICATION NO. : 08/709900
DATED : September 15, 1998
INVENTOR(S) : Adams, Jr. et al.

It is certified that error appears in the above-identified patent and that said Letters Patent is hereby corrected as shown below:

On the title page item [54], and in the specification, column 1, line 1, delete "AND" and insert --AN--

This certificate supersedes the Certificate of Correction issued February 24, 2015.

Signed and Sealed this
Seventeenth Day of March, 2015

Michelle K. Lee
*Director of the United States Patent and Trademark Office*